US011947288B2

(12) United States Patent
Takeuchi

(10) Patent No.: US 11,947,288 B2
(45) Date of Patent: Apr. 2, 2024

(54) FIXING DEVICE HAVING SEPARATION CLAW AND IMAGE FORMING APPARATUS

(71) Applicant: KYOCERA Document Solutions Inc., Osaka (JP)

(72) Inventor: Toshimitsu Takeuchi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 18/246,152

(22) PCT Filed: Sep. 17, 2021

(86) PCT No.: PCT/JP2021/034324
§ 371 (c)(1),
(2) Date: Mar. 21, 2023

(87) PCT Pub. No.: WO2022/065234
PCT Pub. Date: Mar. 31, 2022

(65) Prior Publication Data

US 2023/0367245 A1 Nov. 16, 2023

(30) Foreign Application Priority Data

Sep. 25, 2020 (JP) ................................ 2020-161169

(51) Int. Cl.
*G03G 15/20* (2006.01)

(52) U.S. Cl.
CPC ..... *G03G 15/2028* (2013.01); *G03G 15/2053* (2013.01)

(58) Field of Classification Search
CPC .......... G03G 15/2028; G03G 15/6532; G03G 2215/00573; B65H 29/54; B65H 29/56
USPC .................. 399/323, 398; 271/307, 311, 900
See application file for complete search history.

(56) References Cited

U.S. PATENT DOCUMENTS

2002/0141792 A1 10/2002 Nakano et al.
2019/0369532 A1* 12/2019 Yamanaka ......... G03G 15/2028
2020/0192255 A1* 6/2020 Yamane ............ G03G 15/2032

FOREIGN PATENT DOCUMENTS

DE 4024934 A * 2/1991 ......... G03G 15/6532
EP 2428852 B1 * 5/2018 ......... G03G 15/2028
JP H05-008574 U 2/1993
JP 2002-357975 A 12/2002
JP 2006-339618 A 12/2006
JP 2018-124505 A 8/2018

* cited by examiner

*Primary Examiner* — Robert B Beatty
(74) *Attorney, Agent, or Firm* — Studebaker & Brackett PC

(57) ABSTRACT

A fixing device includes a fixing member, a pressure member, a separation claw which is provided so as to be contactable on a surface of the fixing member and comes into contact with the surface of the fixing member to separate the recording medium from the fixing member at a fixing operation and a moving mechanism which moves the separation claw in a rotational axis direction of the fixing member. The moving mechanism includes a thrust gear having a protrusion on the lower surface of the thrust gear and a thrust cam disposed below the thrust gear having a hole on the upper surface into which the protrusion can be fitted when the fixing device is assembled.

8 Claims, 8 Drawing Sheets

FIXING DEVICE HAVING SEPARATION CLAW AND IMAGE FORMING APPARATUS

TECHNICAL FIELD

The present invention relates to a fixing device which fixes a toner image on a sheet and to an image forming apparatus including the fixing device.

BACKGROUND

An electrophotographic image forming device such as a copy machine, a printer and a multifunction functional includes a fixing device which fixes a toner image on a recording medium such as a paper sheet. The fixing device includes a fixing roller heated by a heating source such as a halogen heater and a presser roller which comes into contact with the fixing roller to form a pressured area. When the recording medium on which the toner image is formed is conveyed to the pressured area, the toner image is heated to be melted and fixed on the recording medium. In addition, a separation claw for separating the recording medium is in contact with the fixing roller under a constant load.

The fixing roller is formed from a thin metal tube. A resin layer or a coating layer is formed on the outer circumferential surface of the thin metal tube to prevent the toner from adhering, thereby enhancing a release performance and preventing the fixing roller from being charged.

In recent years, a polyester toner with a low melting point is sometimes used to save energy. In this case, in the initial stage, a good toner release performance of the fixing roller is maintained, but when the fixing roller is used for a long period of time, the wax and paper powder contained in the toner adheres to the surface of the fixing roller, and the toner release performance may deteriorate. This phenomenon is more generated when the fixing temperature is high. In addition, when the temperature of the pressure roller increases, such as during intermittent printing, the toner release performance may deteriorate even at a low temperature.

In order to improve the toner release performance of the fixing roller, an amount of anti-wear agent contained in the resin layer may be reduced. In this case, however, since the durability is reduced, during repeated use, the coating layer is worn by the separation claw, and the toner adheres to the worn area, resulting in causing image failure.

Therefore, as described in the patent documents below, the separation claw is moved in the rotational axis direction of the fixing member (a thrust movement) to suppress the wear of the coating layer owing to the separation claw. For example, Patent Document 1 describes a fixing device which uses a cam to move a separation member (the separation claw) in an axial direction of a fixing roller. The cam is driven when the number of revolutions of the fixing roller exceeds a predetermined number of times. Patent Document 2 also describes a fixing device which uses a driving force of a fixing roller to move a peeling member (the separation claw) in an axial direction of a fixing roller. Patent Document 3 also describes a fixing device which changes a position of a peeling claw (the separation claw) according to the number of printed sheets. Furthermore, Patent Document 4 describes a fixing device which moves a separation claw when a cumulative driving time or a number of printed sheets reaches a predetermined value.

PRIOR ART DOCUMENTS

Patent Document

Patent Document 1: Japanese Utility Model Application No. 5-8574
Patent Document 2: Japanese Patent Laid-Open No. 2002-357975
Patent Document 3: Japanese Patent Laid-Open No. 2006-339618
Patent Document 4: Japanese Patent Laid-Open No. 2018-124505

SUMMARY OF THE INVENTION

Problems to be Solved by Invention

If there is a scratch on the tip portion of the separation claw or foreign matter such as metal adheres to the tip portion of the separation claw, a minute scratch may occur on the surface of the fixing roller immediately after assembly of the separation claw. In the fixing devices in which the separation claw is operated in the thrust direction as described in the above patent documents, for example, when the separation claw is operated in the thrust direction immediately after the assembly of the fixing device, the scratch on the separation claw or the foreign matter adhered to the separation claw causes a minute scratch on the surface of the fixing member over the range of the thrust operation. When the scratch is generated over the wide area of the surface of the fixing roller in this way, a phenomenon in which a solid area or a halftone area of the image fixed on the recording medium appears white due to light interference (white streaks) may occur.

On the other hand, as described in Patent Documents 1, 3 and 4, when the separation claw is driven in the thrust direction after a certain period of time has elapsed from the start of the fixing operation, such as when the number of revolutions of the fixing roller exceeds a certain number of times, since the contact position between the fixing roller and the separation claw does not change for a certain period of time, the repeated printing operation makes the depth of the scratch deep. Then, the release layer of the fixing roller peels off and the release performance decreases, and the toner adheres to the fixing roller.

Therefore, in view of the above problems, it is an object of the present invention to provide a fixing device which prevents image defects by suppressing the spread of scratches on the surface of the fixing roller immediately after the assembly of the separation claw, and maintains a durability of the fixing member and a good image quality and an image forming apparatus including the fixing device.

Means of Solving the Problems

A fixing device according to the invention, includes a rotatable fixing member which heats a recording medium on which a toner image is formed; a pressure member which comes into contact with the fixing member to form a pressured area at which the recording medium is held and conveyed; a separation claw which is provided so as to be contactable on a surface of the fixing member and comes into contact with the surface of the fixing member to separate the recording medium from the fixing member at a fixing operation; and a moving mechanism which moves the separation claw in a rotational axis direction of the fixing member, wherein when the fixing member is assembled, the moving mechanism immovably positions the separation claw at an initial position in the rotational axis direction, and moves the separation claw in the rotational axis direction at the latest when the fixing operation is started.

An image forming apparatus according to the invention includes an image forming part which forms a toner image on a recording medium; and the fixing device which fixes the toner image on the recording medium.

Effects of the Invention

According to the present invention, it becomes possible to prevent image defects by suppressing the spread of scratches on the surface of the fixing roller immediately after the assembly of the separation claw, and to maintain a durability of the fixing member and a good image quality.

EMBODIMENT FOR CARRYING OUT THE INVENTION

Hereinafter, with reference to the drawings, a fixing device and an image forming apparatus according to one embodiment of the present invention will be described.

Figure 1:
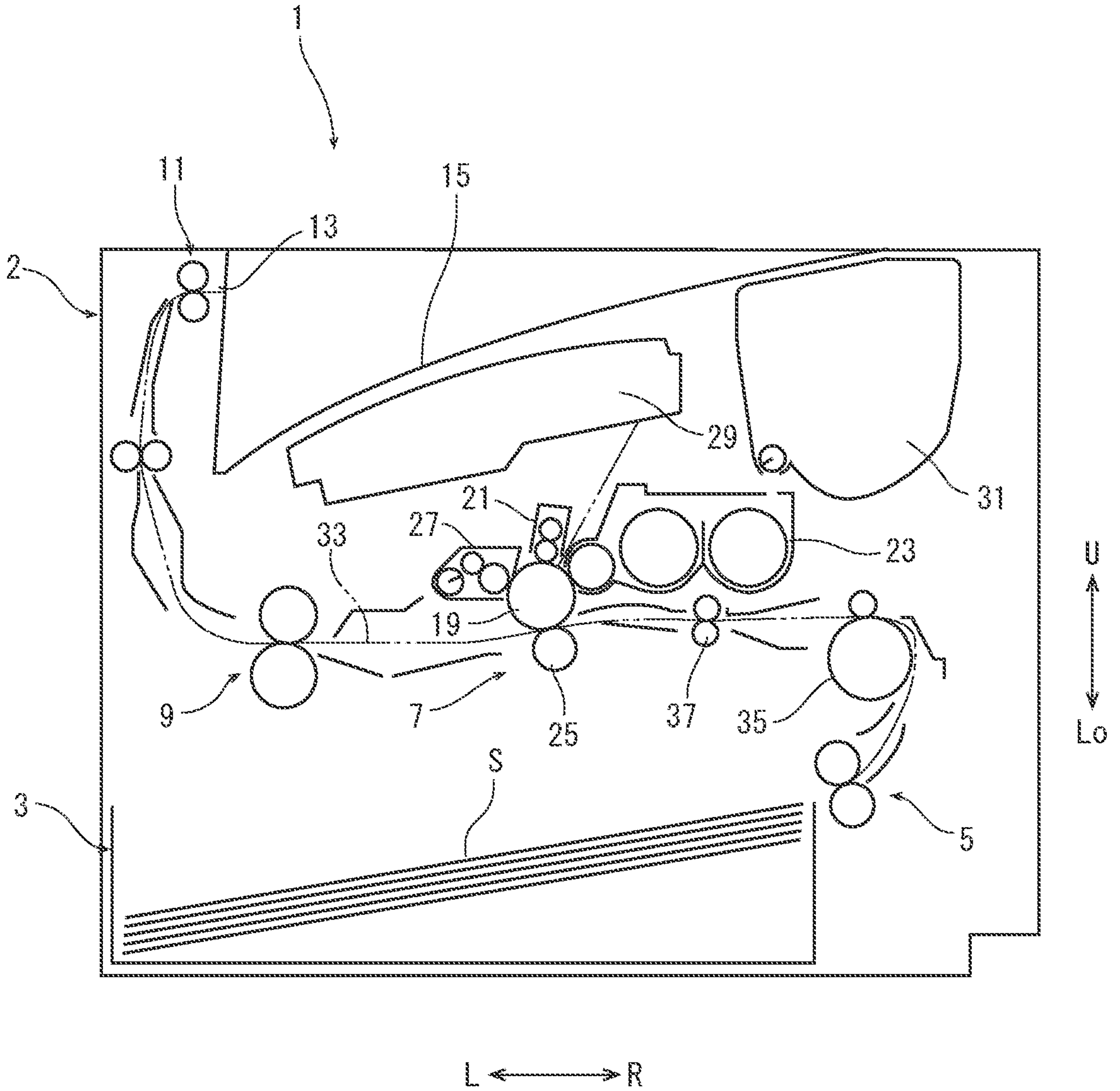
FIG. 1 is a front view schematically showing an internal structure of an image forming apparatus according to one embodiment of the present invention.

First, with reference to FIG. 1, an image forming apparatus 1 according to the embodiment of the present invention will be described. FIG. 1 is a front view schematically showing the internal structure of the image forming apparatus 1. In the following description, the front side of the paper plane on which FIG. 1 is drawn is defined as the front side of the image forming apparatus 1. Fr, Rr, L and R in each drawing indicate the front, rear, left and right sides of the image forming apparatus 1, respectively.

The image forming apparatus 1 includes a box-shaped housing 2 having a hollow part. In the hollow part of the housing 2, a sheet feeding cassette 3 in which a sheet as a recording medium is stored, a sheet feeding device 5 which feeds the sheet from the sheet feeding cassette 3, an image forming part 7 which forms a toner image on the sheet, a fixing device 9 which fixes the toner image on the sheet, and a discharging device 11 which discharges the sheet on which the toner image is fixed are housed. On the upper surface of the housing 2, a sheet discharge port 13 and a discharge tray 15 on which the sheet discharged through the discharge port 13 is stacked are formed.

The sheet feeding cassette 3 is housed in the lower portion of the hollow part in a detachable manner along the front-and-rear direction. The sheet feeding device 5 is disposed on the right upper side of the sheet feeding cassette 3. The image forming part 7 is provided in the center of the hollow part, and includes a rotatable photosensitive drum 19, a charging device 21, a developing device 23, a transfer roller 25 and a cleaning device 27, which are arranged around the photosensitive drum 19 along the rotation direction of the photosensitive drum 19. Furthermore, the image forming part 7 includes an exposure device 29 and a toner container 31 connected to the developing device 23. The fixing device 9 is disposed on the left side of the image forming part 7. The discharging device 11 is disposed inside the discharge port 13 above the fixing device 9.

Furthermore, in the hollow part of the housing 2, a sheet conveyance path 33 is formed. The conveyance path 33 is formed from the sheet feeding device 5 through a transfer nip between the photosensitive drum 19 and the transfer roller 25, the fixing device 9, and the discharging device 11 to the discharge port 13. In the following descriptions, the upstream side and the downstream side indicate the upstream side and the downstream side in the conveyance direction of the sheet along the conveyance path 33. On the conveyance path 33, an intermediate conveyance rollers pair 35 is disposed downstream of the sheet feeding device 5, and a registration rollers pair 37 is disposed between the intermediate conveyance rollers pair 35 and the transfer nip.

Next, an image forming operation of the image forming apparatus 1 having such a configuration will be described. When image data is input to the image forming apparatus 1 from an external computer or the like and an instruction to start printing is given, first, in the image forming part 7, the surface of the photosensitive drum 19 is charged by the charging device 21, and then exposed by the exposure device 29 based on the image data, and an electrostatic latent image is formed on the surface of the photosensitive drum 19. The electrostatic latent image is developed into a toner image by the developing device 23.

On the other hand, the sheet stored in the sheet feeding cassette 3 is fed to the conveyance path 33 by the sheet feeding device 5 and conveyed along the conveyance path 33 by the intermediate conveyance rollers pair 35. Furthermore, the sheet is conveyed to the transfer nip at a predetermined time by the registration rollers pair 37. At the transfer nip, the toner image on the photosensitive drum 19 is transferred to the sheet. The sheet on which the toner image is transferred is conveyed to the fixing device 9, and the toner image is fixed on the sheet by the fixing device 9. The sheet on which the toner image is fixed is discharged from the discharging device 11 through the discharge port 13 to the discharge tray 15. In the image forming part 7, the toner remaining on the photosensitive drum 19 is recovered by the cleaning device 27.

Figure 2:
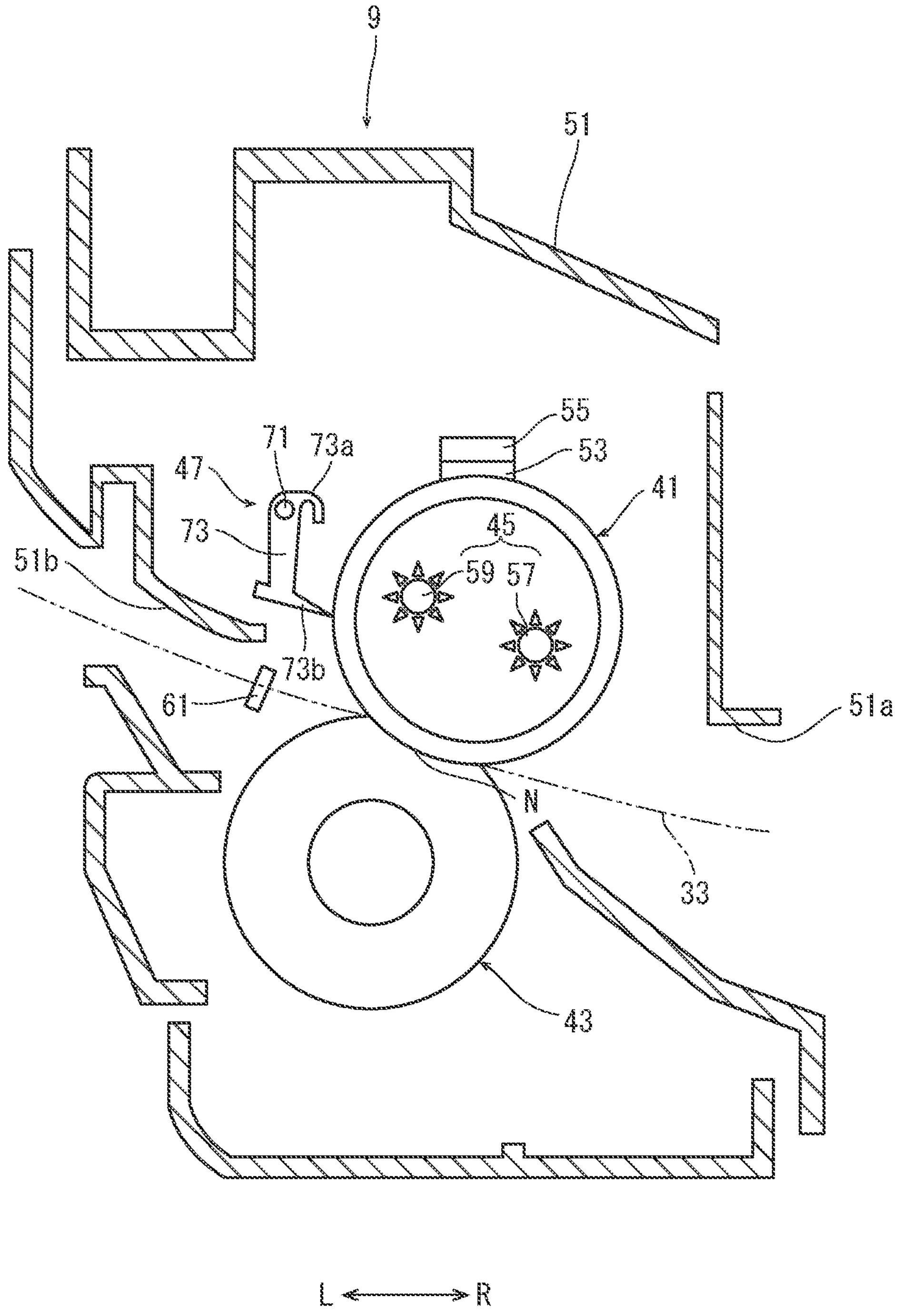
FIG. 2 is a sectional view schematically showing a fixing device according to the embodiment of the present invention.

Next, the fixing device 9 will be described with reference to FIG. 2. FIG. 2 is a sectional view schematically showing the fixing device 9.

The fixing device 9 includes a fixing roller 41 as the rotatable fixing member, a pressure roller 43 as the pressure member which comes into contact with the fixing roller 41 to form a pressured area N at which the sheet is held and conveyed, a heat source 45 which heats the fixing roller 41, a separation claw 47 which comes in contact with the surface of the fixing roller 41 to separate the sheet from the fixing roller 41, a moving mechanism 49 (see FIG. 3) which moves the separation claw 47 in the direction of the rotation axis of the fixing roller 41, and a housing 51 in which they are housed.

The housing 51 is formed in a box shape having an approximately parallelepiped hollow part long in the front-and-rear direction. A sheet inlet 51*a* is formed on the right side wall of the housing 51, and a sheet outlet 51*b* is formed on the left side wall of the housing 51. The sheet conveyance path 33 is formed between the inlet 51*a* and the outlet 51*b*.

The fixing roller 41 is formed in a cylindrical shape, and has a cylindrical core metal and a release layer covering the core metal, for example. The core metal is formed of a thin wall tube made of metal such as aluminum or iron with an outer diameter of 30 mm, for example. The release layer is made of fluororesin such as PFA (tetrafluoroethylene perfluoroalkyl vinyl ether copolymer) or PTFE (polytetrafluoroethylene). The release layer is made of fluoropolymer mixed with abrasion-resistant material (for example, silicon carbide) to improve durability. The release layer may reduce an amount of the abrasion-resistant material or eliminate the abrasion-resistant material in order to improve the release performance. An elastic layer may also be provided between the core metal and the release layer. The fixing roller 41 is formed in an inverted crown shape in which the outer diameter becomes small from both ends to the center in order to suppress the sheet wrinkling.

The fixing roller 41 is disposed above the conveyance path 33 in the hollow part of the housing 51. Both end portions of the fixing roller 41 are rotatably supported on the front and rear sidewalls of the housing 51. On the rear end portion of the outer circumferential surface of the fixing roller 41, a driving gear (not shown) is formed along the circumferential direction. The driving gear is meshed with an output gear of a motor (not shown). The motor is driven to rotate the output gear, and the fixing roller 41 rotates around the rotational axis extending in the front-and-rear direction.

In the housing 51, a contact type thermistor 53 and a non-contact type thermistor 55 which measure the temperature of the fixing roller 41 are provided. The non-contact type thermistor 55 measures the temperature of the central portion of the fixing roller 41 in the axial direction of the fixing roller 41, and the contact type thermistor 53 measures the temperature of the non-sheet passing area outside the sheet passing area of the maximum size sheet.

The pressure roller 43 is formed in a cylindrical shape and has a cylindrical core metal, an elastic layer provided around the core metal, and a release layer covering the elastic layer, for example. The core metal is made of metal such as stainless steel or iron, and has an outer diameter of 12 mm, for example. The elastic layer is made of silicone rubber or silicone sponge, and has a thickness of 9 mm, for example. The release layer is made of fluorinated resin such as PFA, for example.

The pressure roller 43 is disposed below the conveyance path 33 in the hollow part of the housing 51 and parallel to the fixing roller 41. Both end portions of the pressure roller 43 are rotatably supported by the front and rear sidewalls of the housing 51. The pressure roller 43 comes into contact with the fixing roller 41 to form a pressured area N between them. As the fixing roller 41 rotates, the pressure roller 43 follows the fixing roller 41 and rotates in the opposite direction to the fixing roller 41.

The heat source 45 includes a first halogen heater 57 and a second halogen heater 59. The first and second halogen heaters 57 and 59 generate heat by power supply. The first halogen heater 57 has an output of 600 W, and heats the center portion in the sheet width direction perpendicular to the conveyance direction. The second halogen heater 59 has an output of 400 W, and heats both the end portions in the sheet width direction. Both halogen heaters 57 and 59 are disposed in the hollow part of the fixing roller 41, and supported by the housing 51. The first halogen heater 57 is disposed upstream of the second halogen heater 59. The first and second halogen heaters 57 and 59 are driven based on the temperature measured by the contact type thermistor 53 and the non-contact type thermistor 55 to heat the fixing roller 41 to an appropriate temperature.

In the housing 51, a sheet detection sensor 61 is provided. The sheet detection sensor 61 is disposed downstream of the pressured area N, and detects the sheet passing through the pressured area N. The sensor 61 is turned on and off at appropriate times to determine that the sheet is properly passed through the pressured area N.

Figure 3:
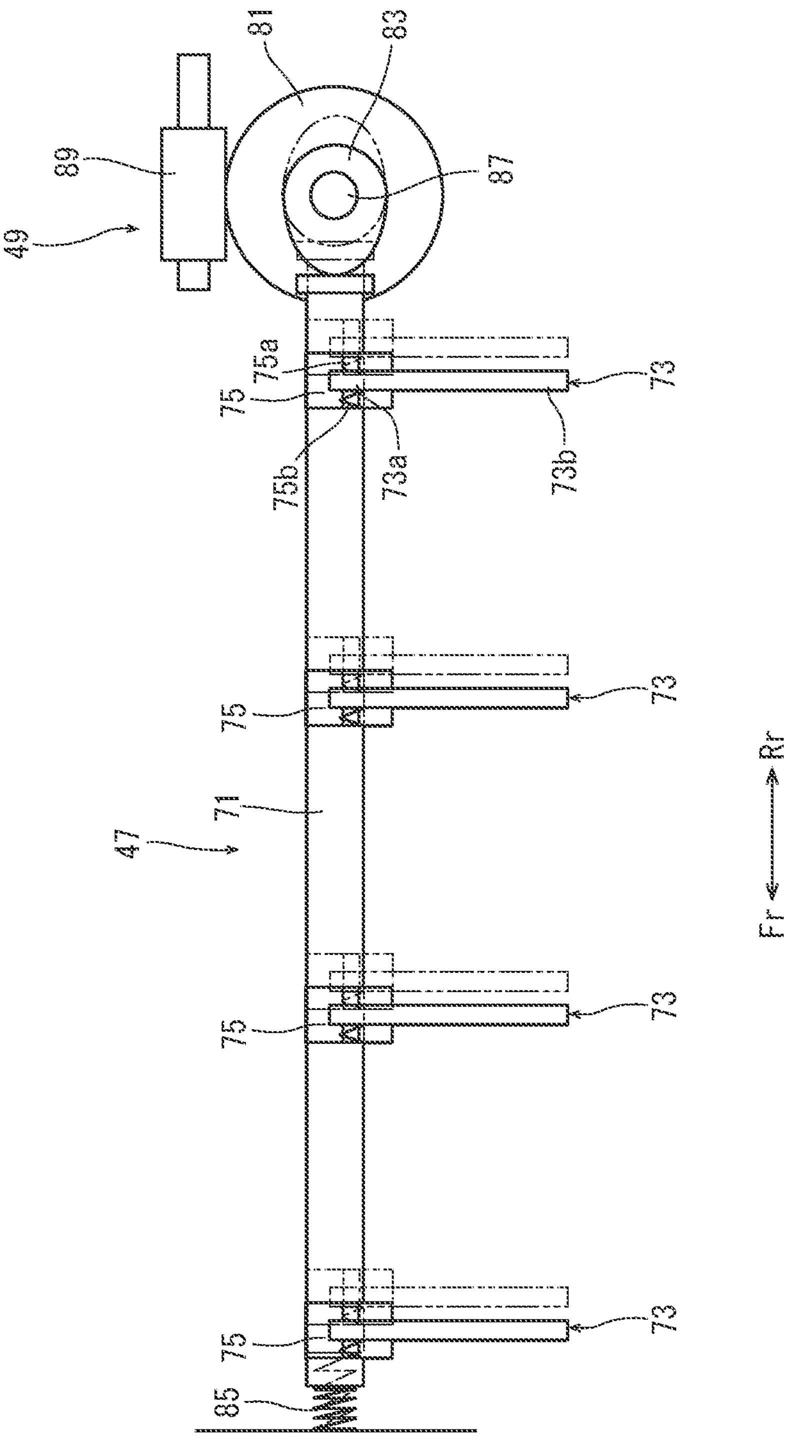
FIG. 3 is a side view showing a separation claw and a moving mechanism in the fixing device according to the embodiment of the present invention.
Figure 4:
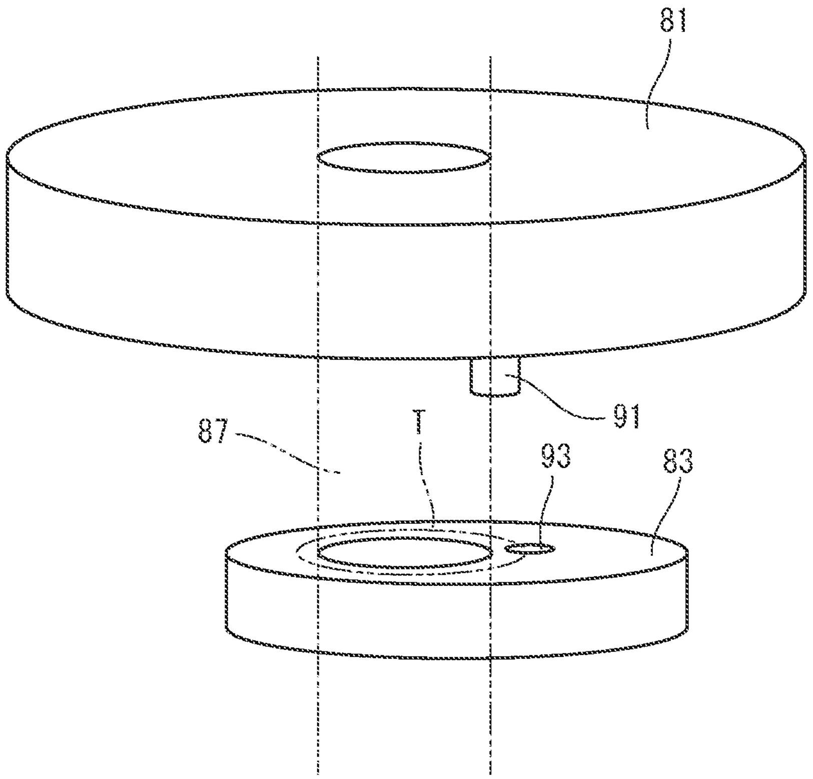
FIG. 4 is a perspective view showing a thrust gear and a thrust cam of the moving mechanism in the fixing device according to the embodiment of the present invention.

Next, with reference to FIG. 2, FIG. 3 and FIG. 4, the separation claw 47 and the moving mechanism 49 will be described. FIG. 3 is a side view showing the separation claw 47 and the moving mechanism 49, and FIG. 4 is a perspective view showing a thrust gear 81 and a thrust cam 83. FIG. 3 schematically shows the positional relationship between the separation claw 47 and the moving mechanism 49.

As shown in FIG. 3, the separation claw 47 has a shaft 71 and a plurality (four in this example) of claw bodies 73 supported by the shaft 71. The shaft 71 is provided with four holder parts 75 at predetermined intervals. Each holder part 75 has a swinging shaft 75*a* parallel to the shaft 71.

Each claw body 73 is a plate piece long in the direction intersecting the axial direction of the shaft 71, having a predetermined width along the axial direction of the shaft 71. The claw body 73 has a base portion 73*a* on one end side and a tip portion 73*b* on the other end side, and has a triangular shape tapered from the base portion 73*a* to the tip portion 73*b* viewed from the axial direction of the shaft 71. The claw body 73 is made of resin material such as polyimide resin or PEK (polyether ketone), for example, and is coated with a coating layer made of fluorine resin such as PFA. The coating layer prevents the toner from adhering.

The four claw bodies 73 are supported by the holder part 75. That is, the claw body 73 is swingably supported by the swinging shaft 75*a* of the holder part 75 at a portion between the base portion 73*a* and the tip portion 73*b*. In addition, a torsion coil spring 75*b* is supported on the swinging shaft 75*a*. The swinging shaft 75*a* is inserted into the coil portion of the torsion coil spring 75*b*, and one arm portion of the torsion coil spring 75*b* is fixed to the holder part 75 and the other arm portion is fixed to the claw body 73.

The separation claw 47 is disposed downstream of the pressured area N in the hollow part of the housing 51, as shown in FIG. 2. The axial direction of the shaft 71 is parallel to the rotational axis direction of the fixing roller 41. Each claw body 73 is biased by the torsion coil spring 75*b*, and comes into contact with the surface of the fixing roller 41 at a predetermined pressure from a direction opposite to the rotational direction of the fixing roller 41.

As shown in FIG. 3 and FIG. 4, the moving mechanism 49 includes a thrust gear 81 disposed on the rear side of the separation claw 47, a thrust cam 83 disposed below the thrust gear 81, and a biasing member 85 disposed on the front side of the separation claw 47 to bias the separation claw 47 toward the thrust cam 83.

The thrust gear 81 is supported rotatably around a support shaft 87 extending along the upper-and-lower direction and movably in the axial direction (the upper-and-lower direction) of the support shaft 87. The thrust gear 81 is meshed with a worm gear 89. The worm gear 89 is meshed with the output gear of the motor driving the fixing roller 41 via a gear train (not shown). As the worm gear 89 rotates, the thrust gear 81 rotates around the support shaft 87. As shown in FIG. 4, a pin 91 is stood on the lower surface of the thrust gear 81 as a protrusion protruding downward.

The thrust cam 83 is disposed below the thrust gear 81, and supported rotatably around the support shaft 87 and immovably in the axial direction of the support shaft 87. That is, the thrust cam 83 rotates around the same support shaft 87 as the thrust gear 81. As shown in FIG. 4, on the upper surface of the thrust cam 83, a hole 93 into which the pin 91 can be fitted is formed on the rotation locus T of the pin 91 around the support shaft 87.

The biasing member 85 is disposed between the front end surface of the shaft 71 and the front side wall of the housing 51. The biasing member 85 biases the shaft 71, that is, the separation claw 47, rearward along the axial direction to bring the rear end surface of the shaft 71 into contact with the cam surface of the thrust cam 83.

Figure 5A:
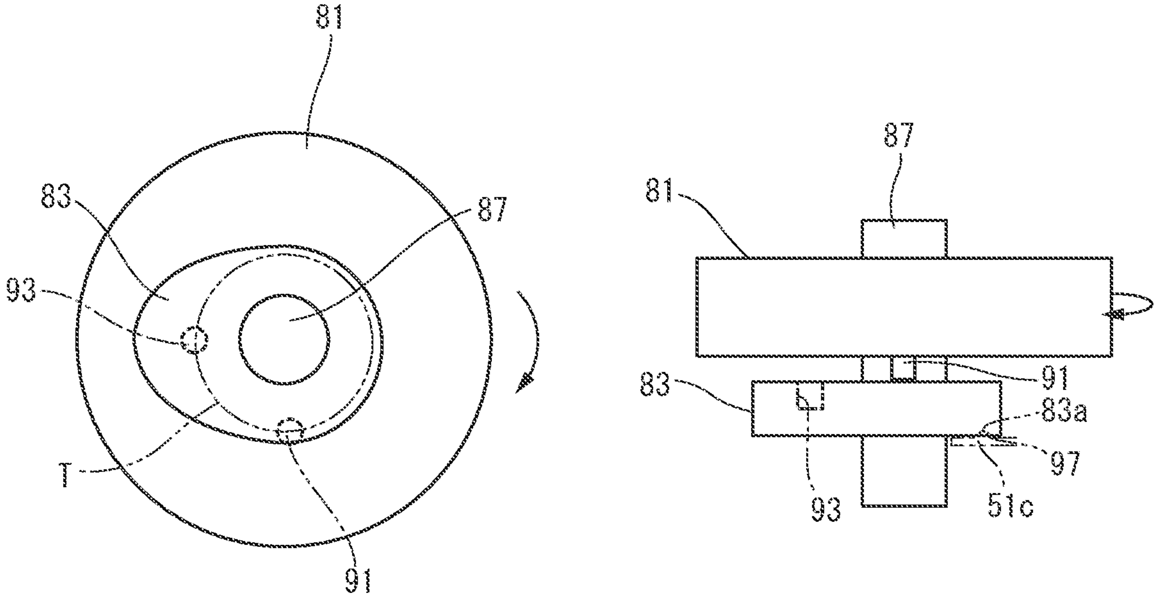
FIG. 5A is a view showing the thrust gear and the thrust cam before they are engaged with each other, in the moving mechanism of the fixing device according to the embodiment of the present invention.
Figure 5B:
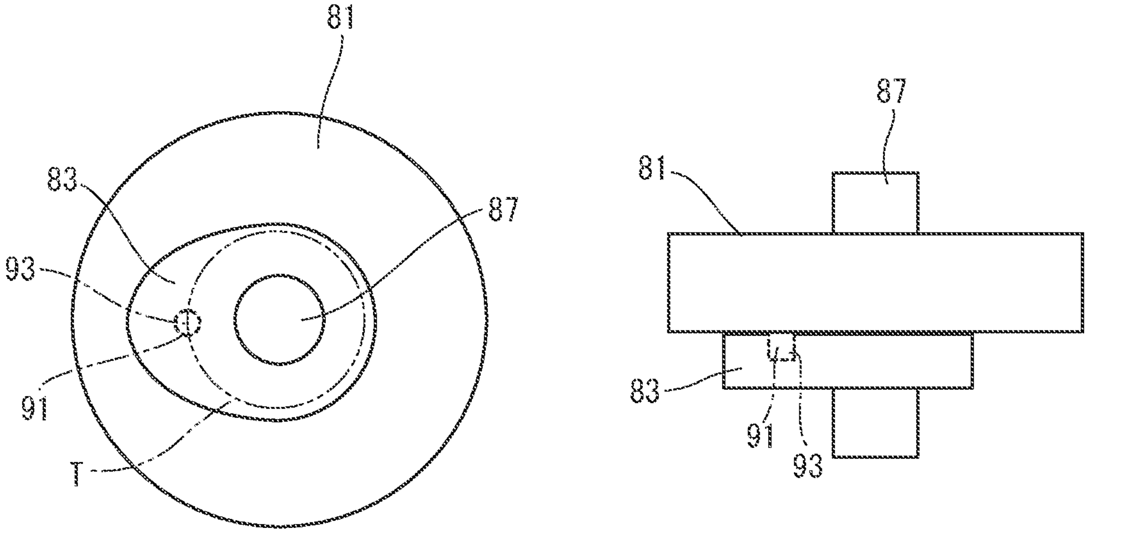
FIG. 5B is a view showing the thrust gear and the thrust cam when they are engaged with each other, in the moving mechanism of the fixing device according to the embodiment of the present invention.

The state of the fixing device 9 having the above configuration at the time of assembling will be described with reference to FIG. 5A and FIG. 5B. FIG. 5A and FIG. 5B show the thrust gear 81 and the thrust cam 83. The figure on the left side of each figure is a plan view showing the thrust gear 81 and the thrust cam 83, and the figure on the right side of each figure is a side view showing the thrust gear 81 and the thrust cam 83.

At the assembling of the fixing device 9 in the factory, as shown in FIG. 5A, in the moving mechanism 49, the pin 91 of the thrust gear 81 places on the upper surface of the thrust cam 83. That is, the pin 91 of the thrust gear 81 does not fit into the hole 93 of the thrust cam 83, and the thrust gear 81 is not engaged with the thrust cam 83. In addition, the claw body 73 (see FIG. 3) of the separation claw 47 is biased by the torsion coil springs 75*b*, and comes into contact with the initial position on the surface of the fixing roller 41 at a predetermined pressure. The torsion coil spring 75*b* is an example of the biasing member which biases the claw body 73 in a direction contacting with the surface of the fixing roller 41.

Thereafter, when an initial adjustment is performed in the factory, the fixing roller 41 is driven by the motor to be rotated. When the motor is driven in this way, that is, when the fixing roller 41 is rotated, the worm gear 89 of the moving mechanism 49 is rotated through the gear train. Then, the thrust gear 81 engaged with the worm gear 89 is rotated around the support shaft 87. On the other hand, since the pin 91 of the thrust gear 81 does not fit into the hole 93 of the thrust cam 83, the thrust cam 83 does not rotate. The pin 91 of the thrust gear 81 moves on the upper surface of the thrust cam 83 along the rotation locus T.

Since the thrust cam 83 does not rotate in this way, the separation claw 47 pressed against the thrust cam 83 does not move. That is, the separation claw 47 does not move in the rotational axis direction (a thrust direction) of the fixing roller 41.

As the thrust gear 81 rotates further and the pin 91 reaches the hole 93 of the thrust cam 83, the thrust gear 81 lowers by its own weight along the support shaft 87 and the pin 91 is fitted into the hole 93, as shown in FIG. 5B. Thus, the thrust gear 81 is engaged with the thrust cam 83. Then, the thrust cam 83 rotates around the support shaft 87 together with the thrust gear 81. When the thrust cam 83 is rotated, the position where the rear end surface of the shaft 71 of the separation claw 47 is pressed against the cam surface of the thrust cam 83 moves in the direction of the rotational axis of the fixing roller 41 (the front-and-rear direction). That is, when the rear end surface of the shaft 71 of the separation claw 47 comes into contact with the cam surface having the largest cam radius of the thrust cam 83, the separation claw 47 moves most forward as shown by the solid line in FIG. 3. Also, when the rear end surface of the shaft 71 of the separation claw 47 comes into contact with the cam surface having the smallest cam radius of the thrust cam 83, the separation claw 47 moves most rearward as shown by the dashed double-dot line in FIG. 3. In this way, the separation claw 47 reciprocates in the rotational axis direction.

As described above, the thrust gear 81 and the thrust cam 83 are engaged with each other while the thrust gear 81 is rotated at least one time.

If there is a scratch on the tip portion 73*b* of the claw body 73 of the separation claw 47 or fine foreign matter is caught between the tip portion 73*b* and the surface of the fixing roller 41, the surface of the fixing roller 41 may be damaged. At the assembling in the factory, since the separation claw 47 is immovably positioned at its initial position, the width of the damage along the rotational axis direction is very narrow and no defect occurs on the image. However, when the separation claw 47 remains at the initial position, that is, when the separation claw 47 does not move in the rotational axis direction of the fixing roller 41, since the contact position between the fixing roller 41 and the separation claw 47 does not change, the repeated printing operation makes the depth of the damage deep. Then, the release layer of the fixing roller 41 peels off, the release performance decreases, and the toner may adhere.

On the other hand, when the separation claw 47 moves in the rotational axis direction immediately after the assembling, a streak having a width along the rotational axis direction is generated on the surface of the fixing roller 41. When such a wide streak is generated, as described above, a phenomenon occurs in which a solid area or a halftone area of the image fixed on the sheet appears white due to light interference (white streaks).

As described above, according to the fixing device 9 of the present invention, at the assembling in the factory, the separation claw 47 is immovably positioned at the initial position, and the separation claw 47 is movable in the rotational axis direction while the thrust gear 81 is rotated at least one time.

That is, since the separation claw 47 is immovably positioned at the initial position during the assembling in the factory, if there is a scratch on the tip portion 73*b* of the claw body 73 of the separation claw 47 or fine foreign matter is caught between the tip portion 73*b* and the surface of the fixing roller 41, the surface of the fixing roller 41 is damaged. However, during at least one rotation of the thrust gear 81, the separation claw 47 becomes movable in the rotational axis direction. That is, since the period in which the separation claw 47 is immovably positioned at the initial position is very short, the depth of the damage is shallow and the width of the damage along the rotational axis direction remains very narrow.

Then, while the thrust gear 81 rotates at least one time, the separation claw 47 moves in the rotational axis direction. That is, when the image forming apparatus 1 is provided to the user for initial operation, the separation claw 47 moves in the rotational axis direction. Then, when the printing operation is repeated and the separation claw 47 is moved, the surface of the fixing roller 41 is scraped by the separation claw 47 or rubbed against the sheet, and the initial damage is eliminated. In addition, the scratch on the tip portion 73*b* of the claw body 73 and the foreign matter adhering to the tip portion 73*b* are peeled off by the sheets repeatedly passing through the printing operation.

In this way, it becomes possible to prevent the image defects generated when there is the scratch on the tip portion 73*b* of the claw body 73 of the separation claw 47 or the fine foreign matter is caught between the tip portion 73*b* and the surface of the fixing roller 41. In addition, by moving the separation claw 47 in the rotational axis direction, the wear of the release layer of the fixing roller 41 can be prevented to improve the durability of the fixing roller 41.

Figure 6A:
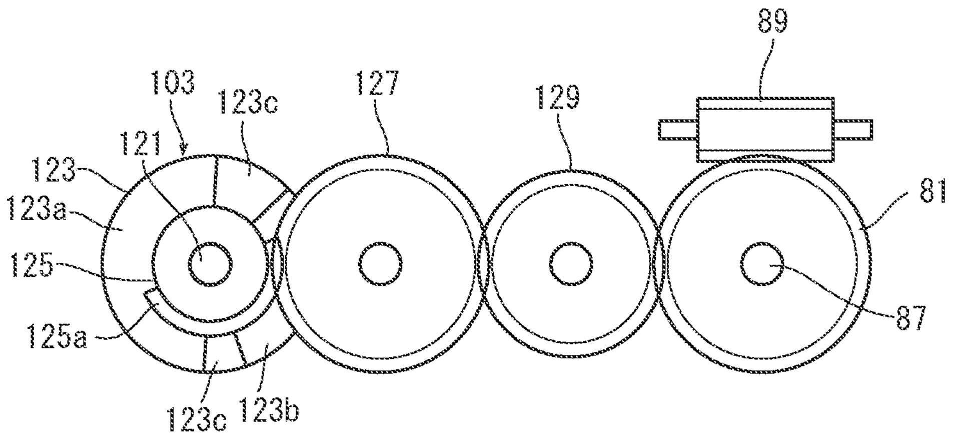
FIG. 6A is a plan view schematically showing the moving mechanism in a state where the separation claw is separated from the fixing roller, in the fixing device according to the embodiment of the present invention.
Figure 6B:
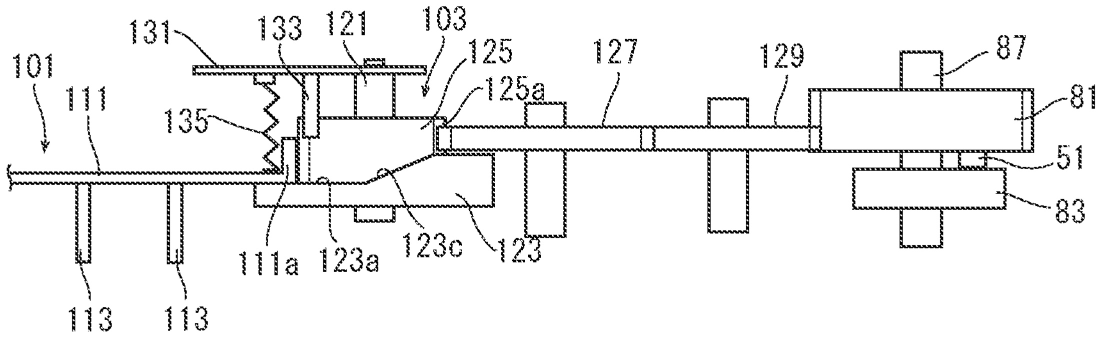
FIG. 6B is a side view schematically showing the moving mechanism in the state where the separation claw is separated from the fixing roller, in the fixing device according to the embodiment of the present invention.
Figure 7A:
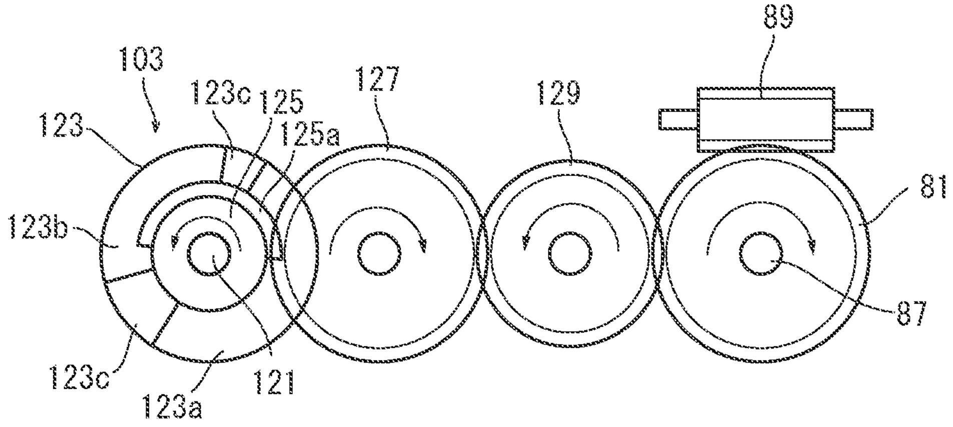
FIG. 7A is a plan view schematically showing the moving mechanism in a state where the separation claw is in contact with the fixing roller, in the fixing device according to the embodiment of the present invention.
Figure 7B:
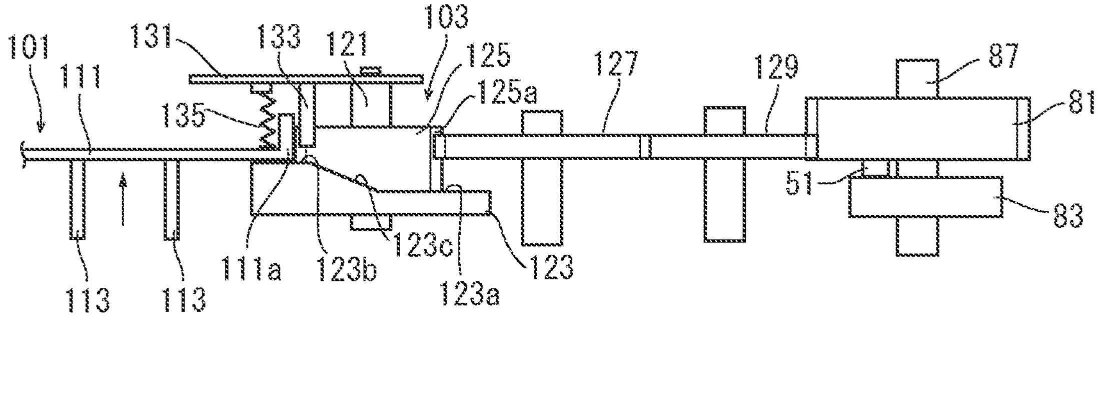
FIG. 7B is a side view schematically showing the moving mechanism in the state where the separation claw is in contact with the fixing roller, in the fixing device according to the embodiment of the present invention.
Figure 8A:
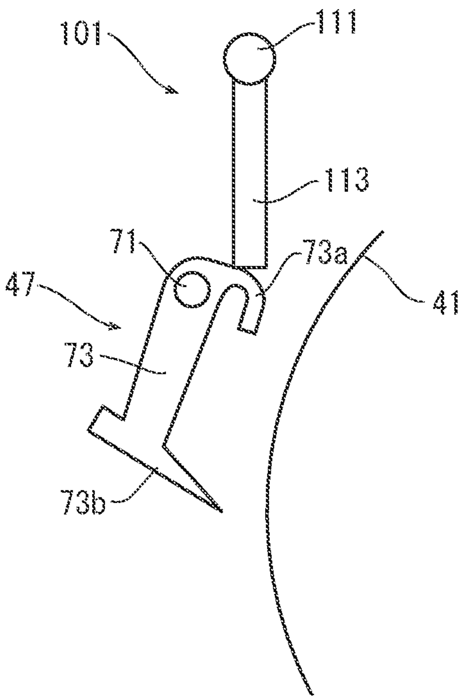
FIG. 8A is a view showing a claw body turned in a direction away from the surface of the fixing roller, in the fixing device according to another embodiment of the present invention.
Figure 8B:
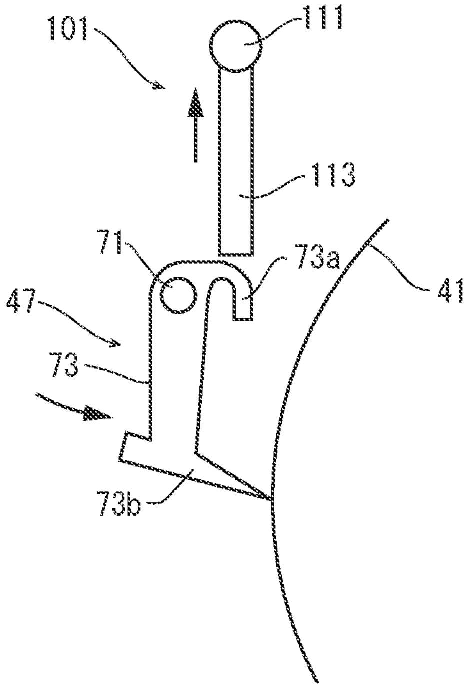
FIG. 8B is a view showing the claw body turned in a direction contact with the surface of the fixing roller, in the fixing device according to another embodiment of the present invention.

Next, another embodiment of the fixing device 9 will be described with reference to FIG. 6A, FIG. 6B, FIG. 7A and FIG. 7B, and FIG. 8A and FIG. 8B. FIG. 6A and FIG. 6B schematically show the moving mechanism 49 in a state where the separation claw 47 is separated from the fixing roller 41, and FIG. 7A and FIG. 7B schematically show the moving mechanism 49 in which the separation claw 47 is in contact with the fixing roller 41. In FIG. 6A and FIG. 7A, a release member 101 and a holding plate 131 are not shown. FIG. 8A shows the claw body 73 turned in a direction away from the surface of the fixing roller 41, and FIG. 8B shows the claw body 73 turned in a direction contacting with the surface of the fixing roller 41.

In another embodiment, as shown in FIG. 6A to FIG. 7B, the moving mechanism 49 further includes a release member 101 (see FIG. 6B and FIG. 7B, not shown in FIG. 6A and FIG. 7A) supported by the housing 51 in a movable manner in the upper-and-lower direction and a release gear 103 which moves the release member 101 in the upper-and-lower direction.

As shown in FIG. 6B and FIG. 7B, the release member 101 has a shaft 111 parallel to the shaft 71 (see FIG. 3) of the separation claw 47 and a push down piece 113 fixed to the shaft 111 corresponding to each claw body 73 of the separation claw 47. One end portion 111*a* of the shaft 111 is bent upward. As shown in FIG. 8A and FIG. 8B, the release member 101 is disposed above the separation claw 47, and each push down piece 113 is disposed above the base portion 73*a* of each claw body 73. As shown in FIG. 8A, when the release member 101 is moved downward, each push down piece 113 pushes down the base portion 73*a* of each claw body 73. Then, each claw body 73 is turned around the shaft 71, and the tip portion 73*b* of the claw body 73 separates from the surface of the fixing roller 41. On the other hand, as shown in FIG. 8B, when the release member 101 is moved upward, each push down piece 113 is separated from the base portion 73*a* of each claw body 73, and each claw body 73 is biased by the torsion coil spring 75*b* (see FIG. 3) to bring the tip portion 73*b* into contact with the surface of the fixing roller 41.

The release gear 103 is provided rotatably around a rotational shaft 121 extending along the upper-and-lower direction. The release gear 103 has a placement portion 123 on which one end portion 111*a* of the shaft 111 of the release member 101 is placed, and a gear part 125 which is provided on the upper surface of the placement portion 123 and is smaller in diameter than the placement portion 123. On the upper surface of the placement portion 123, a flat low placement surface 123*a*, a flat high placement surface 123*b* higher than the low placement surface 123*a*, and an inclined surface 123*c* between both the placement surfaces are formed along the circumferential direction. In this example, the low placement surface 123*a* is formed along approximately a half the circumference of the upper surface, and the high placement surface 123*b* is formed along approximately ¼ of the circumference of the upper surface. The difference in height between the low placement surface 123*a* and the high placement surface 123*b* is equal to the amount of movement of the release member 101 along the upper-and-lower direction required to turn the claw body 73 of the separation claw 47 into a posture in which the tip portion 73*b* comes into contact with the surface of the fixing roller 41 (see FIG. 8A) and a posture in which the tip portion 73*b* is separated from the surface of the fixing roller 41 (see FIG. 8B).

The gear part 125 has a gear 125*a* along a part (in one example, about a half the circumference) of the circumferential direction. The length of the gear 125*a* along the circumferential direction is shorter than the length of the rotational locus of the pin 91 (see FIG. 4, FIG. 5A and FIG. 5B) of the thrust gear 81 until the pin 91 is fitted into the hole 93 of the thrust cam 83. The gear 125*a* is meshed with the thrust gear 81 via idle gears 127, 129.

As shown in FIG. 6B and FIG. 7B, the upper end portion of the rotational shaft 121 of the release gear 103 is fitted into a holding plate 131 fixed to the housing 51. A cylindrical protrusion 133 is formed on the lower surface of the holding plate 131. The protrusion 133 is brought into contact with the side surface of the gear part 125 of the release gear 103 so as to be able to come into contact with the end surface of the gear 125*a*. Furthermore, a coil spring 135 is supported on the lower surface of the holding plate 131. The coil spring 135 presses one end portion 111*a* of the shaft 111 of the release member 101 placed on the upper surface of the placement portion 123 against the upper surface of the placement portion 123.

The state of the fixing device 9 according to another embodiment at the assembling will be described with reference also to FIG. 5A and FIG. 5B.

At the assembling of the fixing device 9 in the factory, as shown in FIG. 5A, in the moving mechanism 49, the pin 91 of the thrust gear 81 is placed on the upper surface of the thrust cam 83, and the thrust gear 81 and the thrust cam 83 are not engaged with each other. Also, as shown in FIG. 6B, one end portion 111*a* of the shaft 111 of the release member 101 is placed on the low placement surface 123*a* of the release gear 103. Thus, as shown in FIG. 8A, each push down piece 113 of the release member 101 pushes down the base portion 73*a* of each claw body 73 of the separation claw 47 to separate the tip portion 73*b* of each claw body 73 from the surface of the fixing roller 41.

Thereafter, when initial adjustment is performed in the factory, the fixing roller 41 is driven by the motor to be rotated. When the motor is driven in this way, that is, when the fixing roller 41 is rotated, the worm gear 89 of the moving mechanism 49 is rotated through the gear train. Then, the thrust gear 81 engaged with the worm gear 89 is rotated around the support shaft 87. On the other hand, since the pin 91 of the thrust gear 81 is not fitted into the hole 93 of the thrust cam 83, the thrust cam 83 does not rotate. The pin 91 of the thrust gear 81 moves on the upper surface of the thrust cam 83 along the rotation locus T.

Also, when the thrust gear 81 is rotated, the release gear 103 is rotated around the rotational shaft 121 through the idle gears 127, 129, as shown in FIG. 7A and FIG. 7B. Then, as shown in FIG. 7B, one end portion 111*a* of the shaft 111 of the release member 101 rides on the high placement surface 123*b* from the low placement surface 123*a* through the inclined surface 123*c*. At this time, since one end portion 111*a* of the shaft 111 is pressed against the upper surface of the placement portion 123 by the coil spring 135, one end portion 111*a* relatively moves from the low placement surface 123*a* to the high placement surface 123*b* through the inclined surface 123*c* smoothly. This causes the release member 101 to move upward, and as shown in FIG. 8B, each push down piece 113 of the release member 101 separates from the base portion 73*a* of each claw body 73 of the separation claw 47, and each claw body 73 is biased by the torsion coil spring 75*b* so that the tip portion 73*b* comes into contact with the surface of the fixing roller 41.

Since the gear 125*a* of the gear part 125 is formed only along a part in the circumferential direction, after the release gear 103 rotates until one end portion 111*a* of the shaft 111 of the release member 101 moves to the high placement surface 123*b*, the gear 125*a* of the gear part 125 comes into contact with the protrusion 133 of the holding plate 131 and the rotation of the release gear 103 is stopped. That is, the release member 101 is held in the state of being moved upward. As mentioned above, since the length of the gear 125*a* along the circumferential direction is shorter than the length of the rotational locus of the pin 91 until the pin 91 of the thrust gear 81 is fitted into the hole 93 of the thrust cam 83, the pin 91 of the thrust gear 81 is not engaged with the hole 93 of the thrust cam 83. That is, the separation claw 47 is held at the initial position in the rotational axis direction.

As the thrust gear 81 is rotated further and the pin 91 reaches the hole 93 of the thrust cam 83, the thrust gear 81 lowers by its own weight along the support shaft 87 and the pin 91 is fitted into the hole 93, as shown in FIG. 5B. As a result, the thrust cam 83 rotates around the support shaft 87 together with the thrust gear 81, as described above. With the rotation of the thrust cam 83, the separation claw 47 reciprocates in the rotational axis direction. At this time, as described above, since the gear 125*a* of the gear part 125 of the release gear 103 comes into contact with the protrusion 133 of the holding plate 131, even if the idle gear 127 is rotated by the rotation of the thrust cam 83, the release gear 103 does not rotate without following it. As a result, the states shown in FIG. 7A, FIG. 7B and FIG. 8B can be maintained even during the moving of the separation claw 47.

In this way, the moving mechanism 49 separates the separation claw 47 from the surface of the fixing roller 41 when assembling the fixing roller 41, and immovably positions the separation claw 47 at the initial position in the rotational axis direction of the fixing roller 41. Then, at the latest, at the start of the fixing operation, the moving mechanism 49 brings the separation claw 47 into contact with the surface of the fixing roller 41, and then moves it in the rotational axis direction. In this embodiment, since the separation claw 47 is separated from the surface of the fixing roller 41 during the assembling, no foreign matter is caught between the separation claw 47 and the surface of the fixing roller 41. Therefore, the occurrence of scratch on the surface of the fixing roller 41 can be prevented, and the wear of the release layer of the fixing roller 41 can be prevented to further improve the durability of the fixing roller 41.

In this embodiment, since the release gear 103 is rotated with the rotation of the thrust gear 81 that moves the separation claw 47 in the rotational axis direction, there is no need to provide a mechanism for rotating the release gear 103 separately. However, a mechanism for rotating the release gear 103 may be provided separately from the thrust gear 81.

A modified example of this embodiment will be described. In the modified example of the fixing device 9, the thrust cam 83 is supported movably along the support shaft 87 and supported by a support plate 51*c* (see FIG. 5A) provided in the housing 51 at a predetermined height. On the upper surface of the support plate 51*c*, a convex portion 97 as a regulating part is formed. The convex portion 97 has a mountain shape having a height lower than that of the pin 91, which is smoothly raised. On the other hand, a recess 83*a* engageable with the convex portion 97 is formed on the lower surface of the thrust cam 83. The convex portion 97 and the recess 83*a* are engaged with each other to regulate the rotation of the thrust cam 83 around the support shaft 87. However, since the convex portion 97 has a mountain shape having a height lower than the height of the pin 91 as described above, a force by which the rotation of the thrust cam 83 is regulated due to the engagement of the convex portion 97 with the recess 83*a* is less than the force by which the thrust gear 81 rotates the thrust cam 83 due to the engagement of the pin 91 of the thrust gear 81 with the hole 93 of the thrust cam 83.

In the modified example, in the initial stage of the assembling, the recess 83*a* of the thrust cam 83 is engaged with the convex portion 97. This restricts the rotation of the thrust cam 83. When the thrust gear 81 is rotated and the thrust gear 81 is engaged with the thrust cam 83 to rotate the thrust cam 83, since the force by which the rotating of the thrust cam 83 is restricted due to the engagement of the recess 83*a* with the convex portion 95 is less than the force by which the thrust cam 83 rotates by the engagement of the thrust cam 83 with the pin 91 of the thrust gear 81, so that the engagement of the recess 83*a* with the convex portion 97 is released and the thrust cam 83 is rotated together with the thrust gear 81. When the engagement of the recess 83*a* with the convex portion 97 is released, the thrust cam 83 is lifted slightly along the support shaft 87 together with the thrust gear 81.

According to the modified example, in the initial stage of the assembling, the rotation of the thrust cam 83 is regulated to regulate the unintended rotation of the thrust cam 83, that is, the unintended moving of the separation claw 47. In this way, the moving of the separation claw 47 can be reliably regulated in the initial stage of the assembling. Therefore, the spread of the damage at the initial stage of the assembling can be surely prevented if there is a scratch in the tip portion 73*b* of the claw body 73 of the separation claw 47 or fine foreign matter is caught between the tip portion 73*b* and the surface of the fixing roller 41.

The method of regulating the rotation of the thrust cam 83 in the initial stage of the assembling is not limited to the above examples. For example, in the early stages of the assembling, the thrust cam 83 and the housing 51 (such as the support plate 51*c*) may be temporarily fixed with a tape having an adhesive surface on one side to regulate the rotation of the thrust cam 83. In this case, the force by which the thrust cam 83 is immovably positioned to the housing 51 with the tape is less than the force by which the thrust gear 81 rotates the thrust cam 83 due to the engagement of the pin 91 of the thrust gear 81 with the hole 93 of the thrust cam 83. The tape has a perforated line along the boundary between the thrust cam 83 and the housing 51.

When the thrust gear 81 is engaged with the thrust cam 83 and the thrust cam 83 rotates, the tape is cut along the perforated line and the thrust cam 83 is rotated together thrust gear 81.

The description of the above embodiment shows one aspect of the invention, and the technical scope of the invention is not limited to the above embodiment.

The invention claimed is:

1. A fixing device comprising:

a rotatable fixing member which heats a recording medium on which a toner image is formed;

a pressure member which comes into contact with the fixing member to form a pressured area at which the recording medium is held and conveyed;

a separation claw which is provided so as to be contactable on a surface of the fixing member and comes into contact with the surface of the fixing member to separate the recording medium from the fixing member at a fixing operation; and a moving mechanism which moves the separation claw in a rotational axis direction of the fixing member, wherein the moving mechanism includes:

a thrust gear which rotates around a support shaft extending in an upper-and-lower direction as the fixing member rotates;

a protrusion formed on a lower surface of the thrust gear;

a thrust cam which is disposed below the thrust gear and rotated around the support shaft;

a hole formed on an upper surface of the thrust cam on a rotational locus of the protrusion around the support shaft, into which the protrusion can be fitted; and a biasing member which biases the separation claw so as to be pressed against the thrust cam along the rotational axis direction, wherein when the fixing device is assembled, the protrusion of the thrust gear is placed on the upper surface of the thrust cam other than the hole and the separation claw is immovably positioned at an initial position in the rotational axis direction, and when the thrust gear is rotated and the protrusion moves on the upper surface of the thrust cam along the rotation locus to be fitted into the hole when the fixing operation is started, the thrust gear and the thrust cam are engaged with each other to rotate the thrust cam around the support shaft and the separation claw moves in the rotational axis direction.

2. The fixing device according to claim 1, wherein the moving mechanism includes a worm gear which is meshed with an output gear of a motor for rotating the fixing member, and the thrust gear is meshed with the worm gear.

3. The fixing device according to claim 1, wherein the moving mechanism separates the separation claw from the surface of the fixing member and immovably positions the separation claw at the initial position in the rotational axis direction when the fixing device is assembled, and the moving mechanism brings the separation claw into contact with the surface of the fixing member and then moves the separation claw in the rotational axis direction latest when the fixing operation is started.

4. The fixing device according to claim 3, wherein the separation claw includes:

a claw body which comes into contact with the surface of the fixing member during the fixing operation;

a shaft which supports the claw body in a turnable manner in a posture coming into contact with the surface of the fixing member and a posture separating away from the surface of the fixing member; and a biasing member which biases the claw body in a direction coming into contact with the surface of the fixing member, and the moving mechanism includes:

a release member which is supported movably upward and downward and pushes down the claw body to turn the claw body in a direction separating away from the surface of the fixing member; and a release gear having a high placement surface and a low placement surface on which one end portion of the release member is placed and rotating around a rotational axis extending in an upper-and-lower direction, and when the fixing device is assembled, one end portion of the release member is placed on the low placement surface of the release gear, and the release member pushes down the claw body to separate the claw body away from the surface of the fixing member, and when the fixing operation is started, one end portion of the release member is relatively moved from the low placement surface of the release gear to the high placement surface by the rotation of the release gear, the release member is moved upward and separated from the claw body, and the claw body is biased by the biasing member to come into contact with the surface of the fixing member.

5. The fixing device according to claim 4, wherein the release gear is rotated with the rotation of the thrust gear.

6. The fixing device according to claim 5, wherein before the thrust gear is engaged with the thrust cam, the release member is moved upward by the rotation of the release gear to be separated away from the claw body, and the claw body is biased by the biasing member to come into contact with the surface of the fixing member.

7. The fixing device according to claim 1, comprising:

a regulating part which is engaged with the thrust cam to regulate the rotation of the thrust cam, wherein a force by which the rotation of the thrust cam is regulated due to the engagement of the thrust cam with the regulating part is less than a force by which the thrust gear rotates the thrust cam due to the engagement of the thrust cam with the thrust gear.

8. An image forming apparatus comprising:

an image forming part which forms a toner image on a recording medium; and the fixing device according to claim 1, which fixes the toner image on the recording medium.

* * * * *